No. 662,274. Patented Nov. 20, 1900.
W. N. KEEN.
NUT LOCK.
(Application filed Sept. 13, 1900.)
(No Model.)
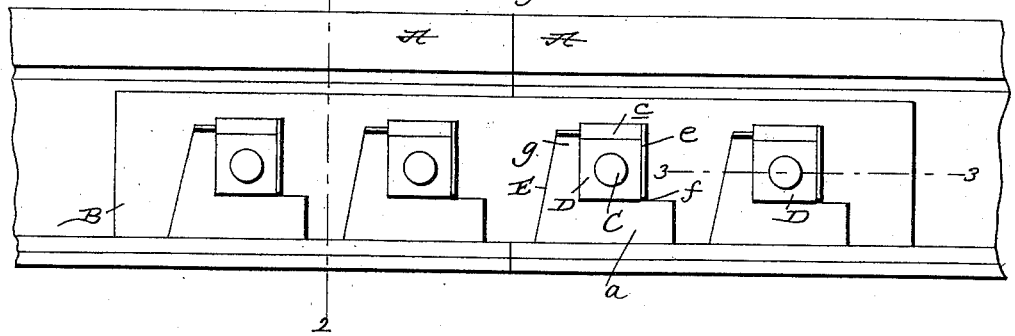
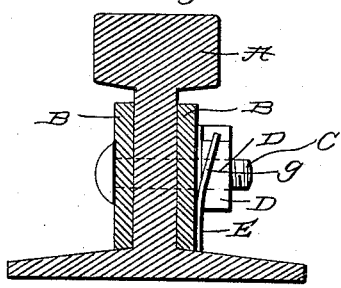
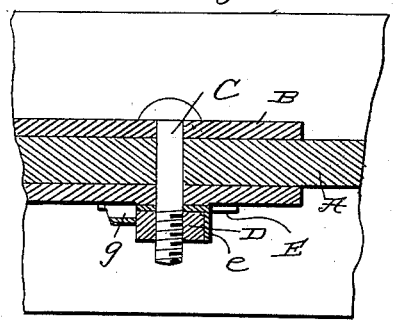
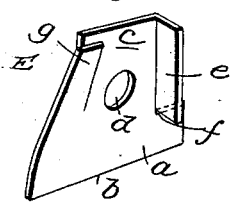
Witnesses:
C. H. Raider
N. C. Healy
Inventor
William N. Keen
By James J. Shely
Attorney

UNITED STATES PATENT OFFICE.

WILLIAM NICHOLSON KEEN, OF NEW ORLEANS, LOUISIANA.

NUT-LOCK.

SPECIFICATION forming part of Letters Patent No. 662,274, dated November 20, 1900.

Application filed September 13, 1900. Serial No. 29,896. (No model.)

*To all whom it may concern:*

Be it known that I, WILLIAM NICHOLSON KEEN, a citizen of the United States, residing at New Orleans, in the parish of Orleans and State of Louisiana, have invented new and useful Improvements in Nut-Locks, of which the following is a specification.

My invention relates to improvements in nut-locks; and it consists in a certain peculiar one-piece nut-locking washer, the novelty, utility, and advantages of which will be fully understood from the following description and claims when taken in connection with the accompanying drawings, in which—

Figure 1 is a view illustrating a plurality of my improved washers as applied to the bolts and nuts of a railway-rail joint. Figs. 2 and 3 are sections taken in the planes indicated by the broken lines 2 2 and 3 3, respectively, of Fig. 1. Fig. 4 is a perspective view of one of the washers removed.

Referring by letter to the said drawings, A A are the meeting ends of two railway-rails, B B fish-plates thereon, C C bolts, and D D nuts on the bolts, all of which may be of the ordinary well-known construction.

E E are my improved nut-locking washers, one of which is arranged on each bolt C and used in conjunction with each nut D to hold the latter against casual loosening or rotation. The washers are each formed in one piece of suitable sheet metal and comprise a lower portion $a$, having a square lower edge $b$ and an upper portion $c$, the latter being provided with an aperture $d$ of a size to receive a bolt and also with a lateral arm $e$, separated from the lower portion by a horizontal slit $f$ and a resilient tongue $g$. The said resilient tongue is disposed vertically and arranged at the opposite end of the upper portion $c$ with reference to the arm $e$. It is formed by slitting the washer from its upper edge downwardly about the proportional distance illustrated.

In applying my improved washers E to the bolts and nuts of a railway-rail joint they are placed on the bolts between the nuts and the adjacent fish-plate with their long square edges $b$ bearing on the bases of the rails, which afford sure rests for the washers and preclude turning of the same. The washers are of course placed in position before the nuts, and as the nuts are turned upon the bolts the resilient tongues $g$ give and do not interfere with the turning up of the nuts. When, however, the nuts are in their proper position, with one of their sides parallel to the tongues $g$, the upper portions of the said tongues will effectually prevent casual turning of the nuts toward the left. While this is so, it will be observed that if it is desired to tighten the nuts the spring-tongues $g$ will permit of them being turned toward the right for such purpose. After the nuts are turned to the positions desired the lateral arms $e$ are bent against the sides of the nuts opposite to those engaged by the spring-tongues $g$, so it will be seen that the nuts are interposed and held between two fastening means and casual loosening or rotation of the nuts is effectually prevented, and this without placing any lateral strain on the bolts. When it is desired to tighten a nut subsequent to the bending of the arm $e$ of a washer against one side of the same, it is simply necessary to bend the lateral arm $e$ against the face of the fish-plate, when the nut may be turned toward the right, as before stated.

It will be obvious from the foregoing that when the conditions are such that it is not necessary to interpose the nuts between the two holding means of the washers the spring-tongues $g$ may alone be depended upon to lock the nuts.

It will be appreciated from the foregoing that while very simple and susceptible of expeditious application to bolts and nuts my improved washers are highly efficient in practice and are very durable, since they do not comprise any spring or other weak element such as is liable to break or get out of order after a short period of use.

Having described my invention, what I claim, and desire to secure by Letters Patent, is—

1. As an improved article of manufacture, the herein-described nut-locking washer, formed of one piece of sheet metal, and consisting essentially of the lower and upper portion, and having an aperture in its upper portion, and also having the horizontal and vertical slits whereby a lateral arm and a resilient tongue arranged opposite to said arm, are formed, substantially as specified.

2. In a nut-lock, the combination with a railway-rail, a bolt extending through the rail, and a nut on the bolt; of the nut-locking washer, formed of one piece of sheet metal, and consisting essentially of the lower portion *a* having the long square edge engaging the base of the rail, and the upper portion *b* interposed between the nut and rail, and having an aperture receiving the bolt, and also having a lateral arm separated from the lower portion *a* and adapted to be bent against one side of the nut, and the resilient tongue arranged to engage the opposite side of the nut with reference to the lateral arm, substantially as specified.

In testimony whereof I have hereunto set my hand in presence of two subscribing witnesses.

WILLIAM NICHOLSON KEEN.

Witnesses:
RANDOLPH QUAVE,
DANIEL T. KEEN.